United States Patent [19]

Schimitschek et al.

[11] 4,262,267
[45] Apr. 14, 1981

[54] PERFORMANCE OF METAL DIHALIDE DISSOCIATION LASERS BY CHANGED BUFFER GAS COMPOSITION

[75] Inventors: Erhard J. Schimitschek; John E. Celto, both of San Diego, Calif.

[73] Assignee: The United States of America as represented by the Secretary of the Navy, Washington, D.C.

[21] Appl. No.: 69,697

[22] Filed: Aug. 27, 1979

Related U.S. Application Data

[63] Continuation-in-part of Ser. No. 874,434, Feb. 2, 1978, Pat. No. 4,168,475.

[51] Int. Cl.$^3$ .............................................. H01S 3/22
[52] U.S. Cl. .............................................. 331/94.5 G
[58] Field of Search ................ 331/94.5 G, 94.5 PE, 331/94.5 D

[56] References Cited

U.S. PATENT DOCUMENTS

| 4,068,194 | 1/1978 | Malarkey et al. | 331/94.5 G |
| 4,196,403 | 4/1980 | Fry | 331/94.5 G |

OTHER PUBLICATIONS

R. Burnham, "Discharge Pumped Mercuric Halide Dissociation Lasers", *Appl. Phys. Lett.* 33(2), Jul. 15, 1978, pp. 156–159.
D. E. Rothe et al., "Analysis of a Spark-Preionized Large-Volume XeF and KrF Discharge Laser", *Optics Communications*, vol. 22, No. 3, Sep. 1977, pp. 265–268.
M. Rokni et al., "Absorption in Ne- and Ar-rich XeF Laser Mixtures", *Appl. Phys. Lett.*, 32(10), May 15, 1978, pp. 622–624.

*Primary Examiner*—James W. Davie
*Attorney, Agent, or Firm*—Richard S. Sciascia; Thomas Glenn Keough

[57] ABSTRACT

A pulsed laser emits laser energy by dissociative excitation of metal dihalide and cyclic recombination. A metal dihalide selected from subgroup II-B of the periodic table of elements is contained within an elongate sealed enclosure. Two elongate electrodes having external terminals are supported in parallel relationship within the enclosure, forming a gap parallel to the principal axis of the enclosure. A source of pulsed electric power is connected to the terminals of the two electrodes, producing repetitive transverse electric discharges across the gap. An inert buffer gas is included within the enclosure for aiding electric discharge uniformity, to provide vibrational relaxation of the lasing medium in its electronic states and to participate in the dissociative excitation process. The buffer gas is one of several mixtures of discrete percentages of neon and nitrogen. The gas/vapor mixture, consisting of the chosen buffer gases and the chosen metal dihalide vapor is ionized by a third electrode within the enclosure connected to a source of pulses which immediately precede the pulses applied to the first and second electrode so that the lasing medium is preionized immediately prior to the principal electric discharge. Two reflective surfaces, one of which is only partially reflective, are aligned with the principal axis of the laser assembly for producing an optical resonator for the emitted laser energy.

3 Claims, 8 Drawing Figures

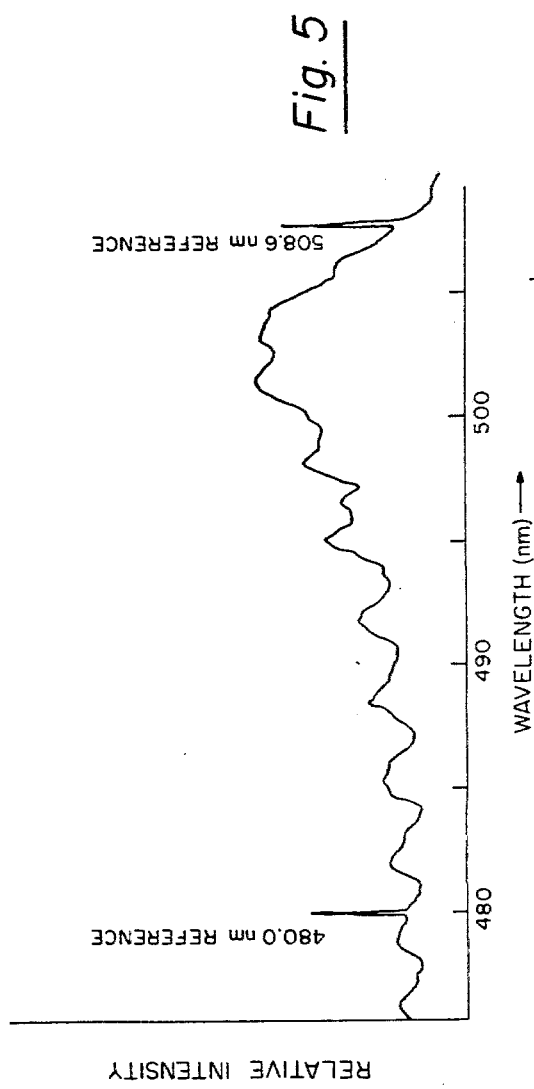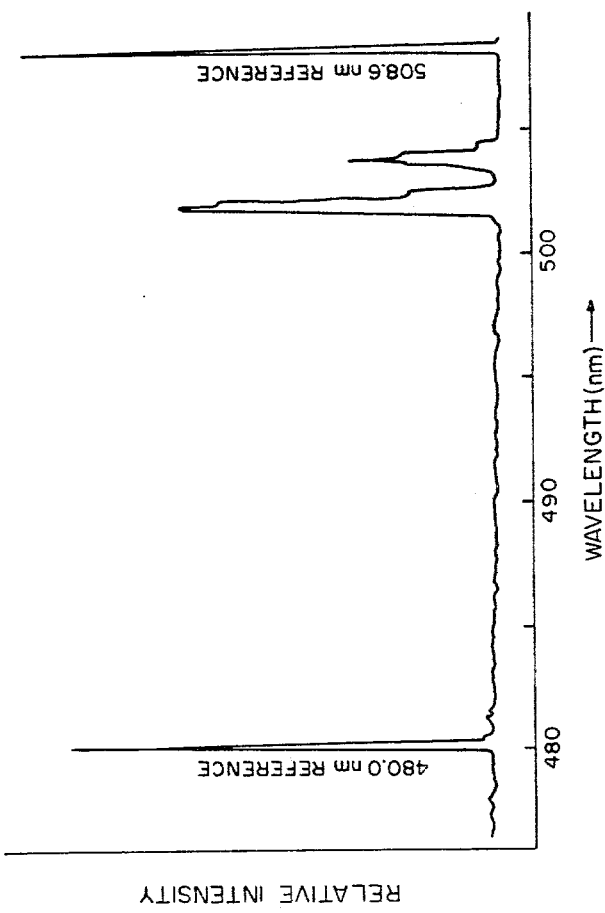

PERFORMANCE OF METAL DIHALIDE DISSOCIATION LASERS BY CHANGED BUFFER GAS COMPOSITION

CROSS REFERENCE TO A RELATED APPLICATION

This application is a continuation-in-part of application U.S. Patent and Trademark Office Ser. No. 874,434 filed Feb. 2, 1978, U.S. Pat. No. 4,168,475.

BACKGROUND OF THE INVENTION

The previous method of dissociating metal dihalides for the purpose of achieving laser action was by means of ultraviolet photons supplied from another laser employed as an excitation pump. Because of the limited efficiency of the pump laser, which was typically less than one percent, the overall efficiency of achieving lasing by photodissociation in metal halides is thus inherently limited as was explained in a publication by Erhard J. Schimitschek, John E. Celto and John Trias which appeared in "Applied Physics Letters" 31, at page 608, Nov. 1, 1977.

In that article it was noted that laser action achieved by photodissociation of $HgBr_2$ in the vapor phase employed excitation pump radiation produced by an ArF excimer laser generating a 193 nm wavelength output. In transverse photo excitation, laser energy of wavelengths from 502 nm to 505 nm were produced by the HgBr laser, the measured output energy being 0.25 mJ at a pump energy level of 7 mJ. Therefore, assuming an approximated one percent efficiency of the ArF excimer laser used as an excitation pump, it can be readily appreciated that the overall efficiency of such photodissociation is severely inherently limited. Accordingly, comparable laser action achieved with metal dihalides which does not require optical pumping from a secondary excitation laser is highly desirable because of its potential for operating at much improved levels of efficiency overall.

Somewhat improved performance has evolved by the use of a nitrogen-helium buffer gas. An article covering $N_2$-He gases and entitled "Discharge pumped mercuric halide dissociation lasers" by R. Burnham appeared in the July 1978 issue of Applied Physics Letters, Vol. 33, No. 2. However, laser outputs and laser efficiencies are still not as high as anticipated. The dissociation process appears to need a buffer gas that will enhance the lasing phenomena by providing vibrational relaxation time at the B and X states and aiding discharge uniformity and by participating in the dissociative excitation process.

SUMMARY OF THE INVENTION

In the present invention, a metal dihalide selected from subgroup II-B of the periodic table of elements is contained within a sealed enclosure or cell. The cell may comprise an elongate glass tube containing two elongate electrodes, preferably of a metal conductor which is resistant to corrosion. The first and second electrodes are supported in spaced parallel disposition within the cell, and have external terminals for connection to a source of pulsed electrical power.

The ends of the enclosure or cell are sealed with flat quartz windows by means of TEFLON O-rings. In addition to the metal dihalide within the sealed enclosure, an amount of a selected inert gas is added to stablize the discharge. A third electrical element contained within the sealed enclosure is employed for preionizing the lasing medium by means of pulsed electrical power applied cyclically and in synchronism immediately preceding the pulses of electrical power applied to the first and second electrodes. Such a preionizing means may be comprised of an electrical conductor encased within glass to produce a corona effect, a flashboard, or equivalent means to give effect to preionization immediately before each pulsing of the first and second electrodes to produce an electric discharge therebetween.

The sealed enclosure assembly is preferably operated at an elevated temperature of approximately the order of 150 degree C. A desired operating temperature may be achieved by reason of the electric discharge between the main electrodes, or, if necessary, the sealed envelope assembly may be encased within a suitable oven to maintain the desired temperature level.

When operated under these conditions, the present invention will produce a partial pressure of the selected metal dihalide of the order of several torr and the application of a preionization pulse, followed by a time-delayed main pulse, produces the lasing action.

Of particular interest and advantage is the fact that the present invention, operating, for example, with $HgBr_2$ produces output laser energy by the simultaneous narrowing of the broad fluorescence spectrum band of the HgBr radical into a few very narrow laser lines centered around 502 nm, which is in the blue-green spectral region within that band of wavelengths known as the "ocean window" wherein light energy transmittance is achieved through ocean waters with the least attenuation.

The buffer gas is a mixture of from about two to twenty percent nitrogen with the remainder neon. Depending on the mixtures' consistency, efficiency and total output can vary.

Accordingly, it is a primary object of the present invention to provide a laser which is operative in a visible spectral region, particularly within the blue-green wavelengths known to be best transmitted through ocean waters.

An equally important object of the present invention is to provide such a laser which is simpler and less expensive than prior art lasers producing laser outputs in the same general spectral region.

A further most important object of the present invention is to provide such a laser which is directly excited in an electric discharge by dissociative excitation without the use of auxiliary external laser excitation sources.

Another important object of the present invention is to provide such a laser which is inherently wavelength tunable.

A further object of the present invention is to provide such a laser which operates in a closed cyclic mode of continuously repeated dissociation and recombination of the lasing material.

Another object of the present invention is to provide such a laser which is essentially self-contained and readily adaptable to fabrication in a compact embodiment.

Still another object is to provide a buffer gas mixture made up of nitrogen and neon gas.

Yet another object is to provide a nitrogen-neon mixture that provides improved operational characteristics compared to nitrogen-helium mixtures.

A further object is to provide for varying efficiencies and outputs by the selective variation of the percentages of nitrogen and neon in the buffer gas.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 5 is a graphical illustration of densitometer trace of the long wavelength part of the emission spectrum of the HgBr radical produced by the operation of an electric discharge in the assembly as shown in FIGS. 1 and 2; and, FIG. 6 is a graphical illustration of the spectral output of the same laser assembly in a state of optical feedback and thus lasing.

DESCRIPTION OF THE PREFERRED EMBODIMENTS

Figure 1:
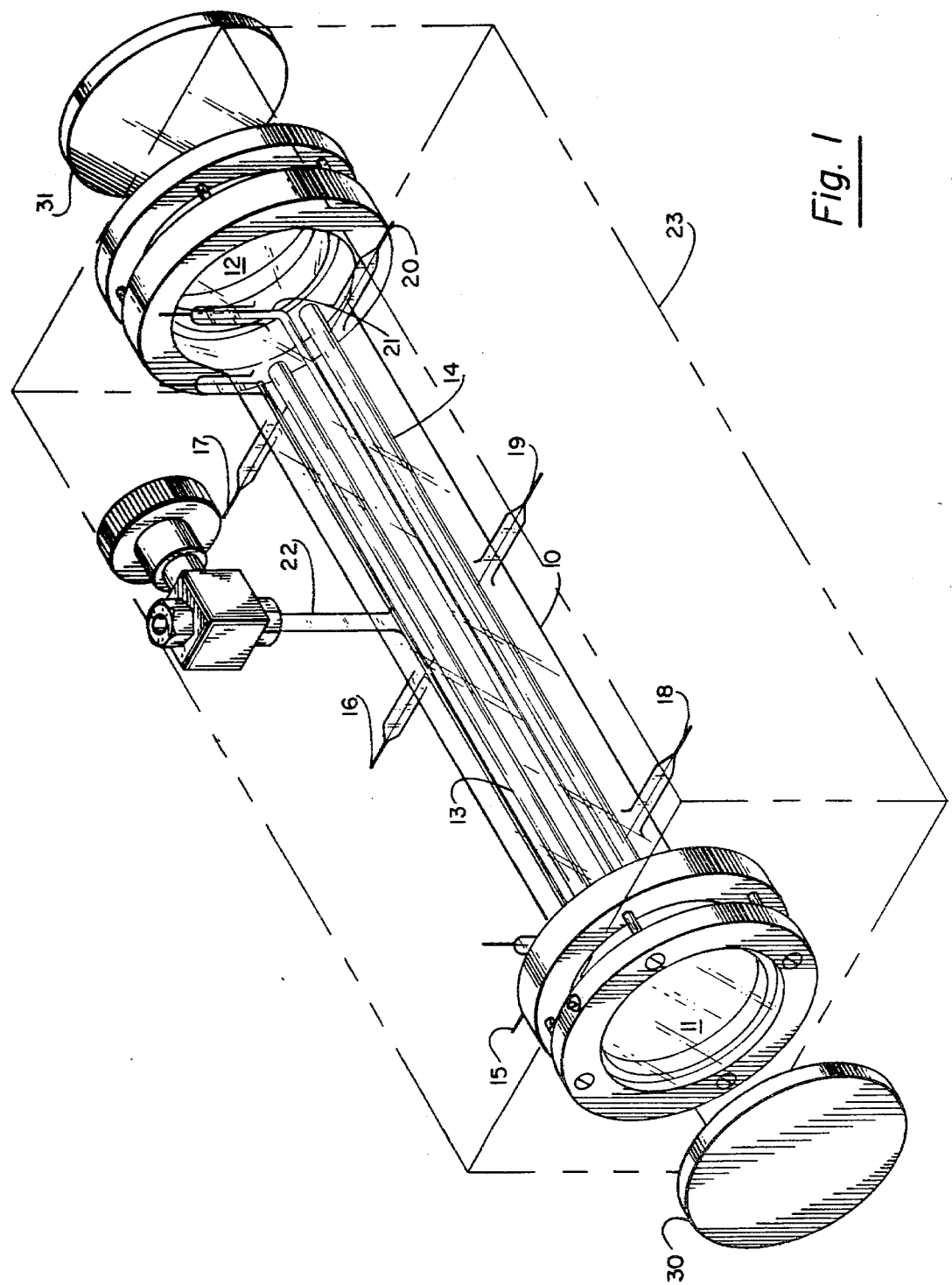
FIG. 1 is a perspective view of an embodiment of the laser cell assembly or enclosure employed in the practice of the present invention.

Successful lasing on the $B2\Sigma^+ \rightarrow X2\Sigma^+$ transition of the HgBr radical by photodissociating HbBr$_2$ in the vapor phase has been achieved as reported by Erhard J. Schimitschek, John E. Celto, and John A. Trias in a paper entitled "Mercuric Bromide Dissociation Laser" which appeared in an "Applied Physics Letters", publication volume 31, at pages 608–610, (1977). In that laser the excitation pump photons were provided by the 193 nm output of a pulsed ArF excimer laser. The HgBr radical producing lasing output on several rotational-vibrational transitions between 502 and 505 nm. Using the same time type of photon excitation, photodissociation of the HgI$_2$ molecule has been achieved to produce lasing on the $B2\Sigma^+ \rightarrow X 2\Sigma^+$ of HgI between 442 and 444 nm.

Both of these types of photodissociation lasers proved to be cyclic. That is, the photodissociation and production of laser output energy is cyclically followed by a recombination so that the cycle is "closed" in that no side products are formed which in time are detrimental to the lasing process as was the case in another method reported to have successfully been used to achieved lasing in HgCl and HgBr as reported by J. H. Parks in a publication appearing in the "Applied Physics Letters", volume 31, starting at page 192 (1977), and volume 31, starting at page 297 (1977). In that method a mixture of Hg, Ar and a halogen-bearing hydrocarbon was exposed to an e-beam pulse leading to undesirable product formation after lasing.

Though the photodissociation of metal dihalides is desirably a cyclic phenomenon producing no unwanted product formation during or after the lasing occurs, it inherently involves the requirement for another laser to provide the photon pump excitation. Since the photon pump excitation source, such as the pulsed ArF excimer laser which was employed to photodissociate the metal dihalides is in itself relatively inefficient, the overall efficiency of such photodissociation metal dihalide lasers inherently suffer from a compound factor of inefficiency. Accordingly, it is highly desirable that the inherent lack of efficiency of a photodissociating excitation source be eliminated. This is achieved by the concept and teaching of the present invention in employing dissociative excitation directly in an electric discharge to provide the electronically excited monohalide fragments of the metal dihalides. Most importantly, the cycle of (1) dissociative excitation by electric discharge (2) emission and lasing, and (3) recombination to the metal dihalides is closed, as in the case of the photodissociation.

For purposes of explanation of the concept and teaching of the present invention and an understanding of its operation, an embodiment employing the metal dihalide HgBr$_2$ will be described. There are several important considerations implicit in the concept of the present invention. Firstly, because the radiative lifetime of the $B2\Sigma^+$ state of HgBr is known to be less than 25 nsec, the use of a fast rise time, transverse electric discharge arrangement is imperative; secondly, the desirability of operating in a closed nonflowing discharge cell makes it important that the device be fabricated of materials compatible with and uneffected by the corrosive vapors.

FIG. 1 illustrates an embodiment of the present invention which is comprised of a sealed enclosure consisting of a cell body 10 of a PYREX glass tube of 4 cm I. D. and 35 cm long. Two flat quartz windows or end plates 11 and 12 are sealed against the cell ends with TEFLON O-rings. Two solid tungsten rods, each 6 mm O. D. and 25 cm long are positioned and supported in spaced parallel relationship 1 cm apart providing electrodes 13 and 14 within the sealed enclosure. Each of the electrodes 13 and 14 is connected with three glass-tungsten feed-through external terminals 15, 16, and 17, and 18, 19, and 20, respectively.

Also contained within the sealed enclosure is a third electrode 21 which consists of heavy tungsten wire completely sealed within glass as an insulating material. The insulated electrode 21 functions to provide preionization as will be understood more fully from the explanation of the operation of the present invention as explained hereinafter. A glass side arm 22 is also provided in the structure for evacuating as well as introducing the metal dihalide and a selected buffer gas made up of a mixture of nitrogen and neon into the interior of the sealed enclosure. The percentage composition, several of the mixtures and their exemplary operating characteristics will be elaborated on below.

Employing the embodiment of the present invention as shown in FIG. 1, it will be readily appreciated that the metal dihalide vapor and its dissociation products are in contact only with glass, tungsten, and TEFLON, thus accomodating the corrosive vapors.

The entire assembly of the sealed enclosure as shown in FIG. 1 is placed in an oven 23 which substantially enclosed the assembly except for its windows. The oven 23 desirably provides a gradual temperature gradient increasing towards its ends to keep the windows 11 and 12 clean for the efficient transmission of laser energy therethrough.

Figure 2:
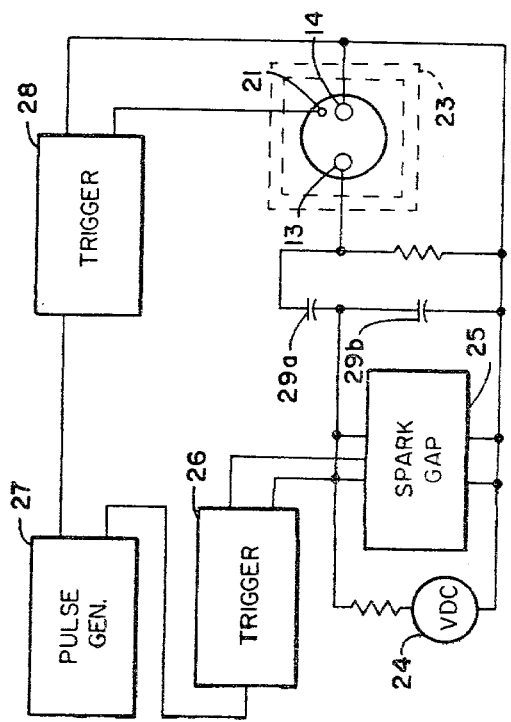
FIG. 2 is a schematic block diagram illustrating a typical embodiment of the present invention including the sources of electrical excitation energy.

The electric discharge within the sealed enclosure of the assembly illustrated in FIG. 1 is provided by a Blumlein-type circuit arranged and connected as shown by the schematic diagram of FIG. 2. As shown in FIG. 2, a source of DC potential 24 is connected to a capacitor bank and a spark gap 25 which, in turn, is connected to a trigger 26 which may be of the commercially available EGG model Tm-12 or model Tm-11.

The trigger 26 is connected to a pulse generator 27 which provides two pulses one of which, indicated as T, is employed for purposes of preionization and the other of which, indicated as T+TΔT, is delayed relative to the preionization pulse and starts the principal electrical discharge within the sealed enclosure. The "T" output of the pulse generator 27 is connected to a second trigger 28 which may be of the same type as the trigger 26. The trigger 28 provides a preionization pulse of electrical energy to the preionization electrode 21 followed by the main pulse which causes an electrical discharge between electrodes 11 and 12 within the sealed enclosure. Capacitors 29a and 29b provide a means of charging in order to build up the electrical potential across the spark gap 25.

A short transmission line with a heat resistant dielectric foil separates the capacitors 29a and 29b, and the sprak gap 25 from the oven 23. The pulse generator 27 provides a selectively variable delay of the main pulse relative to the preionization pulse of up to 10 microseconds.

Figure 3:
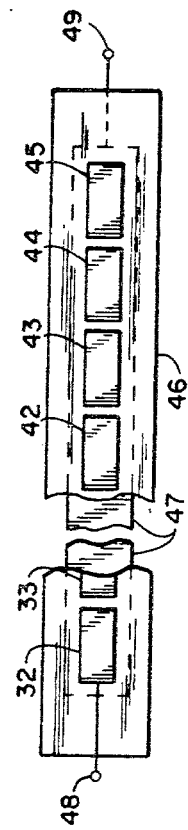
FIGS. 3 and 4 are illustrations of alternate means for affecting preionization of the lasing medium within the sealed enclosure of the present invention.
Figure 4:
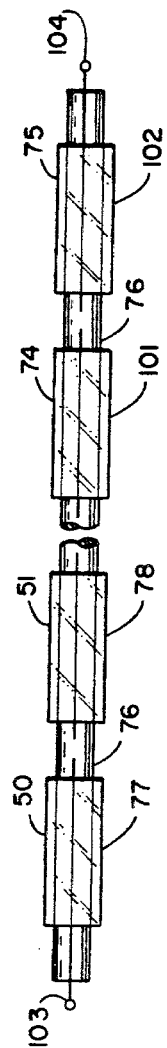

Two alternative means for preionizing the lasing medium within the sealed enclosure are shown in FIGS. 3 and 4. FIG. 3 illustrates a flashboard having multiple gaps as between conductive segments 32, 33, . . . 42, 43, 44, and 45. An insulating material 46 separates the conductive segments 32 through 45 from a single conductive strip 47. When a potential is impressed across terminals 48 and 49 current flows across the multiple gaps, with the plurality of conductive segments 30–45 functioning in a capacitive manner with the single conductive strip 47. Such a flashboard may be used in place of the single conductive electrode 21 insulated with a glass covering and producing a corona-type effect.

FIG. 4 illustrates multiple conductive wires 50–75 such as tungsten, secured in position on a ceramic rod 76 by sections of TEFLON tubing 77–102. When a potential impressed across terminals 103 and 104 current flows across the multiple gaps between the conductors 50–75 providing preionization of the lasing medium within the sealed enclosure of the present invention. This multiple gap arrangement may be used as an alternative to the insulated conductor 21 shown in FIG. 1 or the flashboard shown in FIG. 3.

OPERATION

In the operation of the embodiment of the present invention employing $HgBr_2$ as the metal dihalide to produce laser emission by dissociative excitation, small amount of crystalline $HgBr_2$ of 99.9% purity is introduced into the enclosure. The enclosure is then evacuated, backfilled with 800 torr He and flame-sealed. Improved operation of the laser is assured by the substitution of 800 to 1000 torr of a buffer gas mixture of nitrogen and neon in place of the He. The oven 23 produces a central oven temperature of approximately 100° C. (Alternatively, however, under some operative conditions the electric discharge between the electrodes within the sealed enclosure may develop sufficient heat to maintain the desired temperature and vapor pressures without the need for an oven.) With the source of pulsed electrical power applying a preionizing pulse to the third electrode 21, followed by the main pulses at a 3.5 to 4 microsecond delay, visible emission in the blue-green wavelength range gradually appears from the discharge region between the two principal electrodes 13 and 14. This emission becomes quite strong when the assembly reaches a temperature of approximately 150° to 160° C. which produces a partial pressure of the $HgBr_2$ of approximately 3 torr. Experimentally, the discharge emission spectrum was photographed through a 1 m spectrograph and a densitometer trace of the long wavelength portion of the emission spectrum is shown in FIG. 5. From FIG. 5 it can be easily recognized as the B→X band spectrum of the HgBr radical.

FIG. 6 illustrates the dramatic change in spectral output produced when the sealed enclosure discharge cell of the present invention is positioned between two reflective surfaces shown as elements 30 and 31 in FIG. 1. One of the two reflective surfaces is designed to be substantially totally reflective for the wavelengths involved, while the other is only partially reflective.

In one embodiment of the present invention one of the reflective surfaces was 99% reflective at 500 nm. The reflective surfaces 30 and 31 shown in FIG. 1 were concave in configuration with 2 m radius of curvature and separated by about 50 cm. This arrangement provided optical feedback for the emitted laser energy in the 500 nm region and the onset of line-narrowing was characterized by the appearance of a bright green spot clearly indicative of the desired lasing action.

Alternatively, the reflective surfaces 30 and 31 may be supported on the end plate windows 11 and 12 of the sealed enclosure as shown in FIG. 1. Additionally, the totally reflective surface may be replaced by a totally reflective grating providing a degree of tunability of the wavelengths of laser energy produced. With the arrangement illustrated in FIG. 1 energized by the electrical circuitry described and shown in FIG. 2, lasing action started at an applied voltage to the capacitors as low as 8 KV, or less than 1 Joule of stored energy. The elapsed time delay between the preionization pulses and the immediately following main pulses of electrical energy was observed to be quite critical in producing the desired laser action. In the particular configuration of the embodiment illustrated in FIG. 1, 3.5 to 4 microseconds was found to approximate the optimum. The lasing pulse was measured to be approximately 50 nsec in duration, closely approximating that of the discharge current pulse.

It should be noted that the measured output wavelengths measured as shown in FIG. 6 are identical to those previously obtained on the B→X transition of the same metal halide radical HgBr by photodissociation excitation previously achieved as described in the publication of Erhard J. Schimitschek, John E. Celto, and John A. Trais entitled "Mercuric Bromide Photodissociation Laser" appearing "Applied Physics Letters", Vol. 31 at pages 608–610 (1977). Further confirming the identical outputs achieved by the two different methods of excitation, i.e., photodissociation and electron impact dissociation, is the fact that the relative intensity of the six output wavelengths are in extremely close agreement.

The group of the three spectral lines at approximately 502 nm were tentatively assigned to the v'→"0–22 transition, whereas the other group of three spectral lines at approximately 504 nm may either belong to the 3–26 or 0–23 vibrational transition, or both.

It is of interest that the vibration or relaxation time of the B-state at buffer gas pressures of several hundred torr, was found to be less than 10 nsec. If it is assumed that the relaxation time in the X-state is also that short or shorter, both states would be thermalized in a time which is short compared to the radiative lifetime of the B-state. Considering the large Franck-Condon shift between the B and X-states, this would suggest that the concept of the present invention has in effect produced a four-level laser.

It is important to note that experimental evidence indicates that the lasing material comprising the metallic dihalide is not consumed after lasing but that the process is cyclic as was also found in the case of photodissociation. This is a distinct advantage over other excitation processes such as that in which HgBr was formed and lased by e-beam excitation of a mixture of Hg, Ar, and a bromine beaming compound which led to irreversible product formation in the course of lasing.

Additionally, the present invention by employing a grating as the totally reflective element of the optical resonant cavity, is desirably rendered tunable. For example, employing $HgBr_2$ as the metal dihalide, the laser output of the present invention is tunable from approximately 495 nm to 505 nm.

For purposes of explanation, the operation of the present invention has been described in terms of an embodiment using $HgBr_2$ as the metal dihalide. The concept, teaching, and practice of the present invention is not limited, however, to that particular metal dihalide but, rather is only limited to a metal dihalide selected from the subgroup II-B of the periodic table of elements. For example, $HgCl_2$ after dissociative excitation produces lasing action in the 558 to 559 nm wavelength region; $HgI_2$ after dissociative excitation produces lasing action in the 442-444 wavelength region; $ZnCl_3$ after dissociative excitation produces lasing action approximately in the 865 nm wavelength region; $ZnBr_2$ after dissociative excitation produces lasing action approximately in the 847 wavelength region; $ZnI_2$ after dissociative excitation produces lasing action approximately in the 614 wavelength region; $CdCl_1$ after dissociative excitation produces lasing action approximately in the 870 nm wavelength region; $CdBr_2$ after dissociative excitation produces lasing action approximately in the 810 nm wavelength region; and $CdI_2$ after dissociative excitation produces lasing action approximately in the 660 nm wavelength region.

Those skilled and knowledgeable in the pertinent arts will readily appreciate that a principal advantage of the present invention is its increased efficiency and simplicity. Moreover, its configuration and power requirements are such that it is readily adaptable to being fabricated as a virtual self-contained unit.

As an example of its efficiency, the energy to dissociate $HgBr_2$ into excited HgBr and Br is about 6.5 electron volts. The green laser output photons have an energy of about 2.5 electron volts. Therefore, the theoretical upper efficiency limit is close to 40%. From known ratios of practical efficiency to theoretical efficiency as achieved in other lasers it may be expected that several percent practical efficiency is achievable in the practice of the present invention.

A further most important aspect and advantage of the present invention is the fact that the process of dissociation is reversible. That is to say that the metal dihalide such as $HgBr_2$, for example, producing the HgBr radical, after emission and being back in its ground state, recombines with the formerly split-off Br to reform the $HgBr_2$. Accordingly, the lasing action is produced in a closed cyclic process which constitutes a major advantage over other known lasers in which materials are irreversibly consumed and therefore have to be constantly replaced and replenished.

Improved performance is assured by the introduction of a nitrogen-neon ($N_2$—Ne) buffer gas mixture. A previously tested nitrogen-helium ($N_2$—He) mixture was tried with somewhat acceptable results. Electric discharge uniformity and vibrational relaxation of the laser medium in its electronic states was aided. From further laboratory experiments it became evident that a $N_2$—Ne mixture was far better. For example, a buffer gas having $N_2$ at 150 torr and He at 650 torr filled a laser having 80% reflectivity mirrors. When driven at 12.4 kv, the laser energy caused a 10 mV reading at a detector. The same laser filled with a 150 torr $N_2$ and 650 torr Ne buffer gas mixture and driven at 12.4 Kv developed 15 mV reading. Thus, the approximate 20% $N_2$ to 80% Ne mixture accounted for a 1.5 increase as compared to a similarly ratioed $N_2$—He buffer gas mixture.

Figure 7:
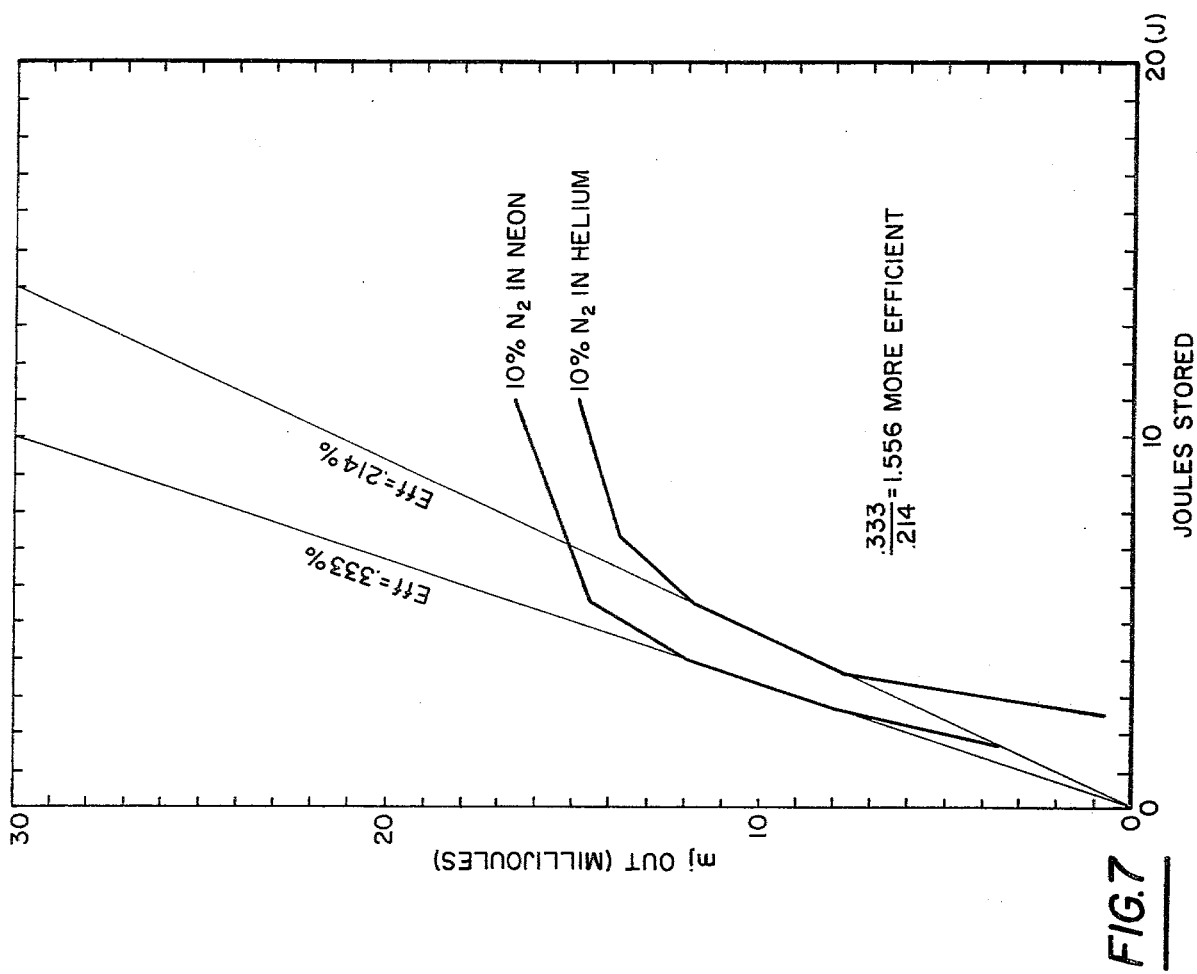
FIG. 7 depicts a comparison of the efficiency and output between a nitrogen-helium buffer gas mixture and a nitrogen-neon buffer gas mixture.

Looking to FIG. 7, a comparison is made between the same laser having 1000 torr buffer gas mixtures of 10% $N_2$ in Ne and 10% $N_2$ in He. The efficiency provided by the $N_2$—Ne buffer gas mixture is approximately 0.333% while the $N_2$—He mixture gives only a 0.214% efficiency. The total output from the laser is higher for the $N_2$—Ne mixture. These empirically developed data establish without doubt the unobvious improved performance of the $N_2$—Ne mixture over the $N_2$—He mixture. An overall improvement of 1.556 is attained by the $N_2$—Ne mixture.

Figure 8:
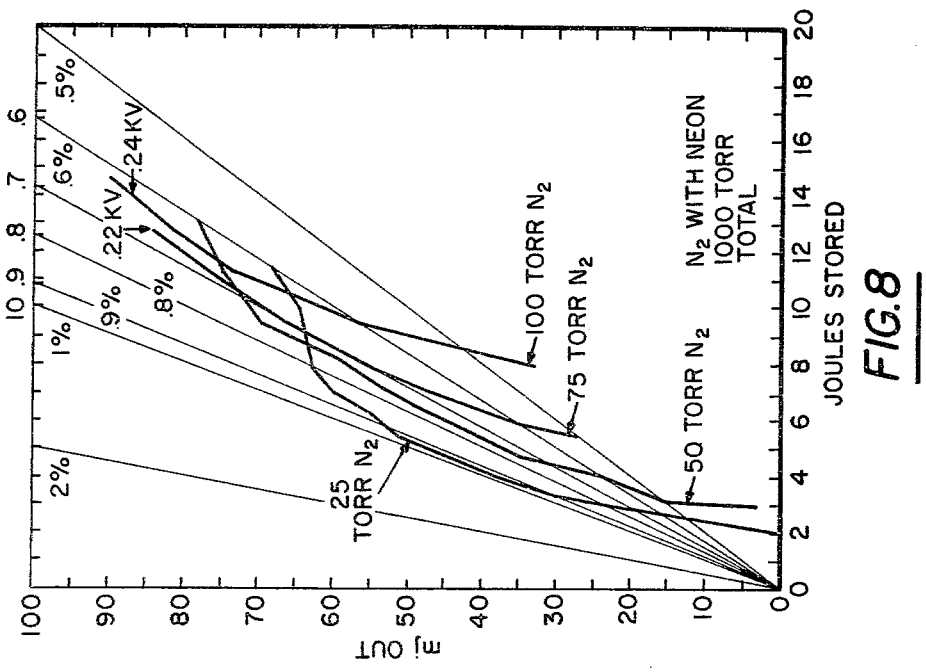
FIG. 8 shows the relative efficiencies and outputs of several nitrogen-neon buffer gas mixtures.

The versatility of the $N_2$—Ne buffer gas mixtures becomes quite apparent by noting FIG. 8. A similar laser tube geometry having improved discharge-electrode configuration is filled with $N_2$—Ne buffer gas mixtures at a total of 1000 torr. The amount of $N_2$ in the mixture was varied from 25 torr (2.5%) to 100 torr (10%) with the balance being Ne.

The plots show the laser output as a function of the joules stored on the energizing capacitors. Efficiency percentages extend from the origin, it being observed that the 25 torr $N_2$—Ne mixture approaches 1% efficiency.

Obviously, many other modifications and variations of the present invention are possible in the light of the above teachings. It is therefore to be understood that within the scope of the appended claims the invention may be practiced otherwise than as specifically described.

What is claimed is:

1. In a pulsed wavelength tunable laser producing laser energy by dissociative excitation of metal dihalides and their cyclic recombination and including a sealed enclosure, first and second elongate electrodes having external terminals and supported in a parallel relationship within the sealed enclosure for forming a gap therebetween, a source of pulsed electrical power connected to the terminals for producing repetitive transverse electric discharges across the gap, a metal dihalide selected from subgroup II-B of the periodic table of elements and contained within the enclosure, a heat source for maintaining the metal dihalide in a vaporized state, a means for preionizing the lasing medium within the enclosure in response to pulses of electrical power cyclically applied in synchronism immediately prior to the pulses produced by the source of pulsed electrical power and a pair of aligned reflective surfaces for producing optical resonance of the emitted laser energy, an improvement therefor is provided comprising:

a buffer gas mixture made up of 2 to 20% of nitrogen and the balance neon is introduced via a fitting into the enclosure for aiding discharge uniformity, and to provide vibrational relaxation of the lasing medium in its electronic states and to participate in the dissociative excitation processes.

2. An improvement according to claim 1 in which the buffer gas has a 2.5% composition of $N_2$ with the balance being Ne to provide for improved efficiency.

3. An improvement according to claim 1 in which the buffer has has a 10% composition of $N_2$ with the balance being Ne to provide for improved output power.

* * * * *